(12) United States Patent
Ghunakikar et al.

(10) Patent No.: US 10,392,938 B1
(45) Date of Patent: Aug. 27, 2019

(54) PRE-SINTERED PREFORM FOR REPAIR OF SERVICE RUN GAS TURBINE COMPONENTS

(71) Applicant: Siemens Energy, Inc., Orlando, FL (US)

(72) Inventors: Somesh J. Ghunakikar, Orlando, FL (US); James A. Yarbrough, Winston-Salem, NC (US); Mark A. Garcia, Pfafftown, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 16/059,490

(22) Filed: Aug. 9, 2018

(51) Int. Cl.
*B23K 1/00* (2006.01)
*F01D 5/00* (2006.01)
*B23P 6/00* (2006.01)
*B23K 31/02* (2006.01)

(52) U.S. Cl.
CPC ............ *F01D 5/005* (2013.01); *B23K 1/0018* (2013.01); *B23K 31/02* (2013.01); *B23P 6/005* (2013.01)

(58) Field of Classification Search
CPC .. B23K 1/0018; B23K 2101/001; B23K 1/20; B23K 35/3046; B23K 1/19; B23K 35/0244; B23K 2103/26; B23K 35/0222; B23K 35/3033; B23K 2101/34
See application file for complete search history.

(56) References Cited

U.S. PATENT DOCUMENTS

| | | |
|---|---|---|
| 2013/0156555 A1* | 6/2013 | Budinger ............ B23K 1/0018 415/182.1 |
| 2014/0154082 A1 | 6/2014 | Shinn et al. |
| 2014/0220376 A1* | 8/2014 | Schick ................... B32B 15/01 228/101 |
| 2015/0125281 A1 | 5/2015 | Georgieva et al. |
| 2015/0125282 A1 | 5/2015 | Georgieva et al. |
| 2016/0199930 A1 | 7/2016 | Yarbrough |
| 2017/0157721 A1 | 6/2017 | Georgieva Fernlund et al. |
| 2017/0225278 A1 | 8/2017 | Georgieva Fernlund et al. |

* cited by examiner

*Primary Examiner* — Erin B Saad

(57) ABSTRACT

A pre-sintered preform (114) and a repair process (100) utilizing the pre-sintered preform (114) are disclosed, each of which result in a brazement (116) comprising a replacement protective coating (118) deposited on a component surface (110). The protective coating (118) exhibits excellent temperature and oxidation resistance, improved adhesion to superalloy surfaces, and reduced depletion over a service life of the associated component (102).

6 Claims, 3 Drawing Sheets

PRE-SINTERED PREFORM FOR REPAIR OF SERVICE RUN GAS TURBINE COMPONENTS

FIELD

The present disclosure relates to the repair of superalloy components, and in particular to pre-sintered preforms and processes for using the same which provide a bond coat to the superalloy component with improved oxidation resistance and less material depletion relative to known structures and processes.

BACKGROUND

Gas turbines are well-known in the art. It is an ongoing quest within the gas turbine field to increase the thermal efficiency of the gas turbine cycle. One way this has been accomplished is via the development of increasingly temperature-resistant materials, or materials that are able to maintain their structural integrity over time at high temperatures. For this reason, the hot gas path components of gas turbine engines are often formed from superalloy materials. The term "superalloy" is used herein as it is commonly used in the art to refer to a highly corrosion and oxidation resistant alloy that exhibits excellent mechanical strength and creep resistance at high temperatures, e.g., >1000° C.

Despite the improvement in materials, the push to drive gas turbine operating temperatures even higher to increase engine efficiency has led to the application of a protective coating to the component surface. In some instances, this protective coating comprises both an oxidation resistant metallic bond coat (e.g., an MCrAlY alloy as is known in the art) and a thermally insulating thermal barrier coating (TBC). In such case, the bond coat further improves adherence of the TBC to the component surface. In other instances, the protective coating merely includes the bond coat, which may be applied to provide an oxidation resistant coating to the component with a degree of thermal protection. In either case, current bond coat application techniques are characterized by the ongoing loss of the bond coat over the service life of the component and/or by limited thicknesses. For example, it has been found that thermally sprayed bond coats can only provide coatings of limited thickness. As the coating thickness increases upon deposition of the bond coat material, compressive forces increase which leads to breaking away or depletion of the bond coat material.

In addition, in the repair of service run components having a bond coat with damage to the underlying substrate, the protective coating is typically chemically stripped from the coating. Thereafter, the underlying substrate is repaired utilizing a brazing or welding technique as known in the art. Next, the protective coating (bond coat or bond coat and TBC) is applied to the component. The sum of all these steps results in significant cost and time, which often leads to disposal of the part rather than bear the expense of repair. Accordingly, improved bond coat application techniques are needed for the repair of service run components which reduce cost and time and result in improved oxidation resistance and reduced material depletion.

BRIEF DESCRIPTION OF THE DRAWINGS

The invention is explained in the following description in view of the drawings that show.

SUMMARY

The present inventors have addressed the deficiencies in the art by developing pre-sintered preforms (PSPs) and processes for utilizing the same which provide for the repair of a base substrate of a turbine component while simultaneously adding a bond coat to the component. In addition, the resulting bond coat has been tested and exhibits excellent thermal and oxidation resistance, improved adherence to the underlying turbine component, and reduced depletion of the bond coat over a service life of the turbine component relative to known application techniques, including thermal spraying of like bond coat materials. Further, via the pre-sintered preforms and processes described herein, the bond coat may be applied as a thicker layer without risking detachment or depletion of the bond coat. The thicker layer advantageously provides for additional thermal protection to the underlying component. The pre-sintered preforms may further be suitable for the repair of service run gas turbine components, such as ring segments, blades, vanes, or the like.

In accordance with one aspect of the present invention, there is provided a repair process comprising:

removing a damaged portion of a service run turbine component to reveal a repair surface;

applying a pre-sintered preform to the repair surface of the turbine component; and heating the pre-sintered preform and the turbine component together to form a brazement comprising a replacement protective coating on the repair surface upon cooling of the preform and the turbine component;

wherein the pre-sintered pre-form is formed from a mixture of a first powder and a second powder, wherein the first powder comprises by wt %:

Ni: 33.0-35.0;
Cr: 21.4-23.4;
Si: 8.6-9.2;
Al: 2.4-3.0;
W 1.2-1.6;
Ta 0.6-0.8;
B 0.45-0.65;
C 0.05-0.15;
Fe 0.15-0.45; and
Co balance and wherein the second powder comprises by wt %:

N 32;
C 21;
Al 8;

Y 0.5; and
Co balance.

In accordance with another aspect, there is provided a pre-sintered pre-form comprising a sintered mixture of a first powder and a second powder, wherein the first powder comprises by wt %:
Ni: 33.0-35.0;
Cr: 21.4-23.4;
Si: 8.6-9.2;
Al: 2.4-3.0;
W 1.2-1.6;
Ta 0.6-0.8;
B 0.45-0.65;
C 0.05-0.15;
Fe 0.15-0.45; and
Co balance and wherein the second powder comprises by wt %:
N 32;
C 21;
Al 8;
Y 0.5; and
Co balance.

In accordance with yet another aspect, there is provided a bond coat composition comprising by wt %:
Ni: 33.0-35.0;
Cr: 21.4-23.4;
Si: 8.6-9.2;
Al: 2.4-3.0;
W 1.2-1.6;
Ta 0.6-0.8;
B 0.45-0.65;
C 0.05-0.15;
Fe 0.15-0.45; and
Co balance.

DETAILED DESCRIPTION

Figure 1:
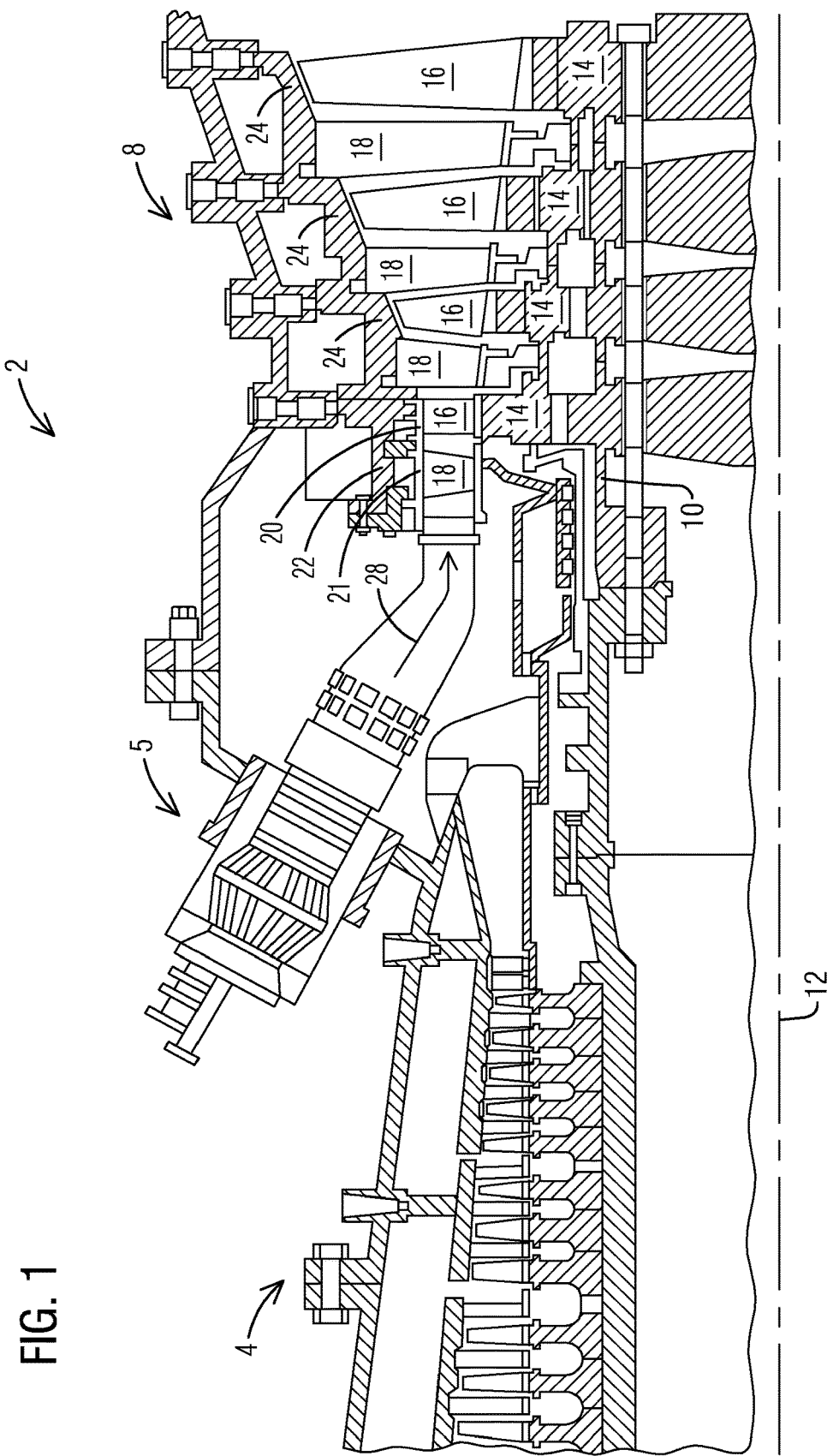
FIG. 1 illustrates an embodiment of a gas turbine engine employing a component prepared in accordance with an aspect of the present invention.

Now referring to the figures, FIG. 1 illustrates a known gas turbine engine 2 having a compressor section 4, a combustor section 6, and a turbine section 8. In the turbine section 8, there are alternating rows of stationary airfoils 18 (commonly referred to as "vanes") and rotating airfoils 16 (commonly referred to as "blades"). Each row of blades 16 is formed by a circular array of airfoils connected to an attachment disc 14 disposed on a rotor 10 having a rotor axis 12. The blades 16 extend radially outward from the rotor 10 and terminate in blades tips. The vanes 18 extend radially inward from an inner surface of vane carriers 22, 24 which are attached to an outer casing 26 of the engine 2. Between the rows of vanes 18 a ring seal 20 is attached to the inner surface of the vane carrier 22. The ring seal 20 is a stationary component that acts as a hot gas path guide between the rows of vanes 18 at the locations of the rotating blades 16. The ring seal 20 is commonly formed by a plurality of ring segments 21 that are attached either directly to the vane carriers 22, 24 or indirectly such as by attachment to metal isolation rings (not shown) attached to the vane carriers 22, 24. During engine operation, high-temperature/high-velocity gases 28 flow primarily axially with respect to the rotor axis 12 through the rows of vanes 18 and blades 16 in the turbine section 8.

Figure 2:
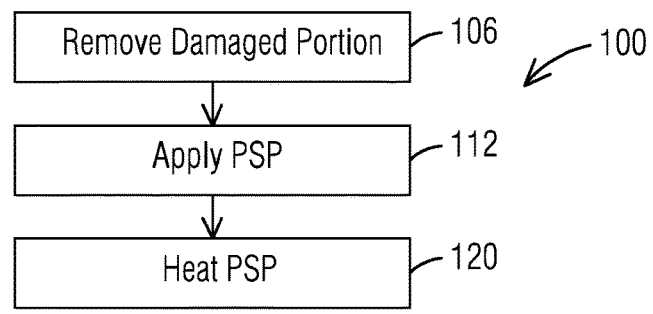
FIG. 2 is a schematic representation of a repair process in accordance with an aspect of the present invention.
Figure 3:
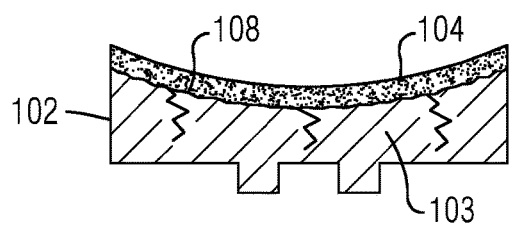
FIGS. 3-4 illustrate the removal of an existing protective coating in accordance with an aspect of the present invention.
Figure 4:
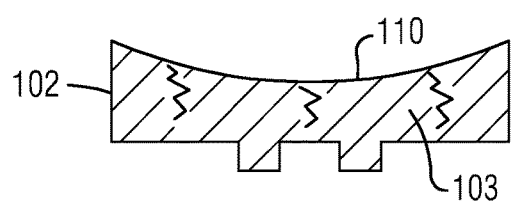

FIG. 2 illustrates non-limiting steps in a process 100 for repairing a service run turbine component 102 having a protective coating 104 thereon. In a first step and as shown in FIG. 3-4, the process 100 comprises step 106 of removing a damaged portion 108 of the service run turbine component 102 (FIG. 3) to reveal a repair surface 110 (FIG. 4). The damaged portion 108 includes at least a portion of the protective coating—if not all of the protective coating 104. In certain embodiments, a portion of the base substrate 103 of the component 102, including defects (cracks or the like) therein, may also be removed. In other embodiments, the base substrate 103 is not removed and any defects are filled in with the melted PSP material as described below. The protective coating 104 may comprise a bond coat alone or a bond coat in combination with a thermal barrier coating (TBC). Alternatively, the protective coating 104 may comprise any other suitable temperature and oxidation resistant coating. The service run turbine component 102 may be any component of the gas turbine engine 2 described above, such as a vane 18 or a ring segment 21. The removing of the damaged portion 108 may be done by any suitable method, such as by machining the surface of the component 102.

When machining is utilized, machining may include any mechanical (non-chemical) process known in the relevant art to remove metallic and/or ceramic materials from a metallic base substrate. Non-limiting examples of machining processes include grinding processes including CNC (computer numerical control) grinding techniques, as well as known processes for mechanically blending machined surfaces to remove raised areas and/or loose materials. Blending and cleaning techniques may be used to ensure that the resulting machined surface is uniformly shaped (e.g., flat, arcuate, convex, concave, etc.) and free from production contamination. The non-gas path sides of the machined surface (e.g., back side, circumferential ends, forward and aft faces) may optionally be grit blasted to provide clean secondary surfaces, with care taken to avoid grit blasting of the gas path surface.

Use of machining (grinding) in lieu of chemical techniques to remove a worn or damaged protective coating 104 avoids the incongruities and defects that often accompany chemical removal processes already known in the relevant art. Unlike chemical techniques, machining may completely remove a worn or damaged protective coating 104 while minimizing an amount of the substrate material that is removed from the component 102. The machining step can provide a machined surface free of surface incongruities and defects that are generally unavoidable when using prior art chemical cleaning/weld buildup techniques.

In certain embodiments, the process 100 may further comprise cleaning the machined (repair) surface 110. For example, this may be done via a fluoride ion cleaning (FIC) process as is known in the art to from a component surface suitable for subsequent brazing. In some embodiments the FIC process may involve cleaning with hydrogen fluoride gas. Use of FIC cleaning advantageously removes unwanted oxides and residual coating remnants (e.g., diffusion coating remnants) from the machined surface and within microscopic and macroscopic cracks present on the repair surface 110. In other embodiments, cleaning of the repair surface 110 may be carried out using vacuum cleaning, hydrogen cleaning, or a combination of vacuum cleaning, hydrogen cleaning and/or fluoride ion cleaning, depending upon on the material characteristics of the metallic base.

Figure 5:
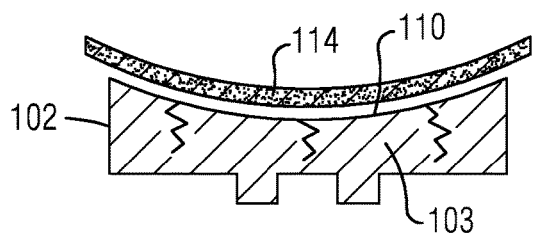
FIGS. 5-6 illustrate the application of a PSP (having a composition as described herein) to a component to form a replacement protective coating on the component in accordance with an aspect of the present invention.
Figure 6:
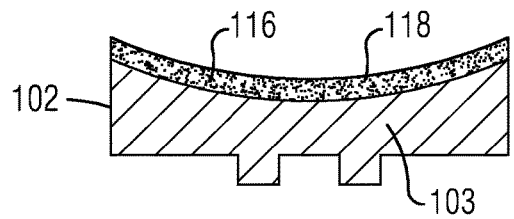

Once the repair surface 110 is prepared, referring again to FIG. 2, the process 100 further includes step 112 of applying a pre-sintered preform (PSP) 114 to the repair surface 110 of the turbine component 102 (FIG. 5) and step 120 of heating the PSP 114 and the turbine component 102 together to form a brazement 116 comprising a replacement protective coating 118 on the repair surface 110 upon cooling of the PSP 114 and the turbine component 102. To reiterate, the protective coating 118 comprises at least a bond coat. In certain embodiments, the PSP 114 is temporarily secured to a surface the component 102 by a suitable method or structure, such as by spot welding. The heating 120 may done by subjecting the PSP 114 and the component 102 to a temperature at or about a predetermined temperature. In an embodiment, the predetermined temperature comprises a solution temperature of the material of the PSP 114. In certain embodiments, the heating is done at a temperature of 2125° F.±25° F. (1163 C±3° C.). The heating 120 may further be done isocratically or with a temperature gradient. In an embodiment, the temperature is held at or about the desired temperature for an amount of time to suitably melt the PSP 114 and allow diffusion of the molten material into the component 102 to fill any defects in the base substrate (if present). In an embodiment, the heating (brazing) is done in an inert atmosphere, such as in the presence of argon gas or the like.

As will be explained below, the composition of the PSP 114 is such that the PSP 114 may both repair the component 102 (by supplying material compatible with the underlying substrate to fill in any defects) and provide a replacement protective coating 118 comprising at least a bond coat for the component 102. The PSP 114 may be provided or formed by any suitable process. In an embodiment, the PSP 114 is prepared by mixing a first (bond coat) powder with a second (braze) powder in a second powder in a predetermined amount and ratio. The resulting powder mixture is then subjected to a heat treatment (sintering) process to sinter the powder mixture and form the PSP 114. The PSP 114 may have a predetermined thickness and a shape that is complementary to the shape of the repair surface 110 to provide surface-to-surface contact when placed together. The predetermined thickness of the PSP 114 may be controlled to obtain a protective coating having a required thickness to adequately protect the surface of the component 102. As noted, the use of a PSP 114 as described herein further allows for thicker protective coatings to be added to the component 102 relative to conventional processes, e.g., thermal spray application of protective coatings. Typically, the shape of the PSP 114 is determined by the shape of a mold in which the sintering occurs. The thickness of the PSP 114 is controlled to obtain a replacement protective coating 118 having a required thickness to adequately protect the surface of the component 102. In certain embodiments, the resulting PSP 114 may further be shaped by, for example, cutting in order to dictate the ultimate shape and size of the protective coating 118 as a result of heating step 120.

In forming the PSP 114, the first (bond coat) powder comprises a thermally-protective metal alloy adapted to bond to and protect a surface of the component 102 against thermal conditions. In an aspect of the present invention, the bond coat powder comprises in wt %:

Ni: 33.0-35.0;
Cr: 21.4-23.4;
Si: 8.6-9.2;
Al: 2.4-3.0;
W 1.2-1.6;
Ta 0.6-0.8;
B 0.45-0.65;
C 0.05-0.15;
Fe 0.15-0.45; and
Co balance.

In a specific embodiment, the bond coat powder comprises by wt %:

Ni 34;
Cr 22.4;
Si 8.9;
Al 2.7;
W 1.4;
Ta 0.7;
B 0.55;
C 0.12;
Fe 0.3; and
Co balance.

In certain embodiments, the bond coat powder further comprises from 0.01 to 0.3 by weight of a member selected from the group consisting of Ti and Zr. In accordance with an aspect, the bond coat powder has shown through experimental testing improved adherence, thermal resistance, and oxidation resistance, as well as reduced material depletion relative to known materials.

The second (braze) powder comprises a composition which serves as a braze material capable of binding to the component surface and which yields a brazement 116 similar in strength to the material of the underlying component 102. In this way, the PSP 114 provides a material which repairs the underlying component 102, as well as provides an excellent bond coat (replacement protective coating 118). In a particular embodiment, the second (braze) powder comprises a braze powder comprising the following composition in wt %:

N 32;
C 21;
Al 8;
Y 0.5; and
Co balance.

Currently, a material with the above composition is commercially available under the trade name CO-210 from Praxair Surface Technologies.

The base substrate 103 of the component 102 comprises an alloy material, and in particular embodiments a superalloy material, such as a nickel-based or a cobalt-based superalloy material, as is well known in the art. The term "superalloy" may be understood to refer to a highly corrosion-resistant and oxidation-resistant alloy that exhibits excellent mechanical strength and resistance to creep—even at high temperatures. Exemplary superalloy materials are commercially available and are sold under the trademarks and brand names Hastelloy, Inconel alloys (e.g., IN 738, IN 792, IN 939), Rene alloys (e.g. Rene N5, Rene 41, Rene 80, Rene 108, Rene 142, Rene 220), Haynes alloys, Mar M, CM 247, CM 247 LC, C263, 718, X-750, ECY 768, 262, X45, PWA 1483 and CMSX (e.g. CMSX-4) single crystal alloys, GTD 111, GTD 222, MGA 1400, MGA 2400, PSM 116, CMSX-8, CMSX-10, PWA 1484, IN 713C, Mar-M-200, PWA 1480, IN 100, IN 700, Udimet 600, Udimet 500 and titanium aluminide, for example. The present inventors have found that the above second (braze) powder is particularly suitable for the repair of components 102 formed from superalloys presently commercially sold under the trade names Hastelloy X, Inconel (IN) 738, and Inconel (IN) 939. Accordingly, in an embodiment, the base substrate 103 comprises one of a Hastelloy X, an IN 738 material, and an IN 939 material.

When present, Hastelloy X typically includes the following nominal composition in wt %:

Ni balance
Cr 22
Fe 18
Mo 9
Co 1.5
W 0.6
C 0.1
Mn 1.0 max

Si 1.0 max
B 0.008 max
Nb 0.5 max
Al 0.5 max
Ti 0.15 max
Ni balance

In addition, when present, IN 738 typically includes the following nominal composition in wt %:

C 0.11-0.17
Co 8.50
Cr 16.0
Mo 1.75
W 2.60
Ta 1.75
Nb 0.90
Al 3.40
Ti 3.40
B 0.010
Fe 0.05 max
Mn 0.02 max
Si 0.30 max
S 0.015 max
Ni balance Further, when present, IN 939 typically includes the following nominal composition in wt %:

Cr 22.4
Co 19
Al 1.9
Ti 3.7
Ta 2.5
W 1.6
Zr 0.1
C 0.15
B 1

The first (bond coat) powder and the second (braze) powder may be provided in any suitable ratio relative to one another. In certain embodiments, the first (bond coat) powder is provided in a 25-75 wt % ratio of the total powder composition. In a particular embodiment, the first (bond coat) powder and the second (braze) are provided in a 1:1 ratio or 50:50 wt %. In this way, the powder mixture and resulting PSP is easily reproducible. The particle size of the powder particles may be of any suitable size and range. In an embodiment, the powder particles have range from a mesh size from about 10 (2000 microns) to about 1250 (10 microns). As used herein, the term "about" refers to an amount that is plus or minus 2% from the stated value. In some embodiments the powder sizes of the first and second powders range from about −120 to +325 mesh. In addition, when necessary, the powder mixture may be bound together into a paste using a liquid binder, in which case the liquid binder ranges from about 5% by volume to about 15% by volume of the powder mixture.

In accordance with an aspect of the present invention, the direct application of the PSP 114 to the repair surface 110 to apply a braze/bond coat mixture thereto allows for more precise placement and bonding (using, for example, resistance tack welding) of the PSP 114 to the repair surface 110. In addition, use of the PSP 114 also provides improved control over the thickness of the resulting protective coating 118 and, as discussed, allows for thicker bond coats to be applied to the component 102 surface relative to thermal spraying, for example.

In certain embodiments, the process 100 may also comprise applying a braze paste onto the component 102 surface to fill cracks and other inhomogeneities that may be present on the component 102 surface. The braze paste may comprise, for example, a powder mixture in a paste form being bound together using a liquid binder as described above. Use of the optional braze paste may be beneficial in certain embodiments wherein pre-processing of the component surface results in cracks, grooves, or other inhomogeneities which may affect contact and bonding of the PSP 114 to the component 102 surface.

In the applying of the PSP 114 and heating 120 steps, one or more PSPs 114 may be applied onto the component 102 surface such that at least one PSP 114 covers the desired repair area on the repair surface 110. In certain embodiments, a plurality of PSPs 114 are layered upon one another to produce a thicker protective coating 118 or a graded protective coating 118 in which the composition of the protective coating 118 is varied along the thickness thereof. In another embodiment, a first PSP 114 that exactly covers the component 112 surface is applied to the component 112 surface and a second PSP 114 is applied on top of the first PSP 114, wherein the second PSP 114 has a larger surface area than the first PSP 114 and is positioned to overhang each edge of the component 112 surface. In still other embodiments, a single PSP 114 may be disposed onto the component 112 surface, wherein the single PSP 114 may partially or fully cover the component 112 surface or may overhang at least one boundary (edge) of the component 112 surface.

Figure 7:
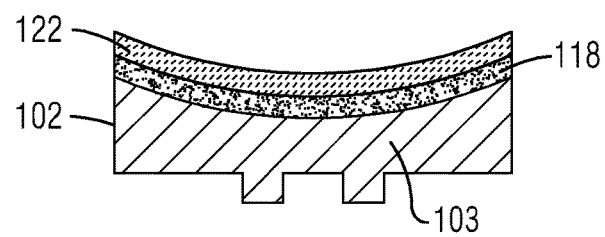
FIG. 7 illustrates the application of a thermal barrier coating to the repaired surface in accordance with an aspect of the present invention.

Following the heating step 120 and forming of the brazement 116 having a replacement protective coating 118, in certain embodiments, an additional thermally resistant material, e.g., a thermal barrier coating (TBC) 122, may be applied to the replacement protective coating 118 as shown in FIG. 7. The TBC 122 may be applied by any suitable process, such as a thermal spray process, a slurry-based coating deposition process, or a vapor deposition process as is known in the art. In an embodiment, the TBC 122 is applied via a thermal spray process such as a plasma spray process.

The TBC 122 may comprise any suitable material which provides an increased temperature resistance to the component 102 when applied thereto. In an embodiment, the TBC 122 comprises a stabilized zirconia material. For example, the TBC 122 may comprise an yttria-stabilized zirconia (YSZ), which includes zirconium oxide ($ZrO2$) with a predetermined concentration of yttrium oxide ($Y_2O_3$), pyrochlores, or other thermally resistant material known in the art. In another embodiment, the TBC 122 may comprise a friable graded insulation (FGI), which is known in the art, such as in U.S. Pat. Nos. 6,670,046 and 6,235,370, which are incorporated by reference herein. It is contemplated that the TBC 122 may have any desired thickness suitable for its intended application.

EXAMPLES

The systems and methods described herein will be further illustrated through the following examples, which are illustrative in nature and are not intended to limit the scope of the disclosure.

Example 1

Figure 8:
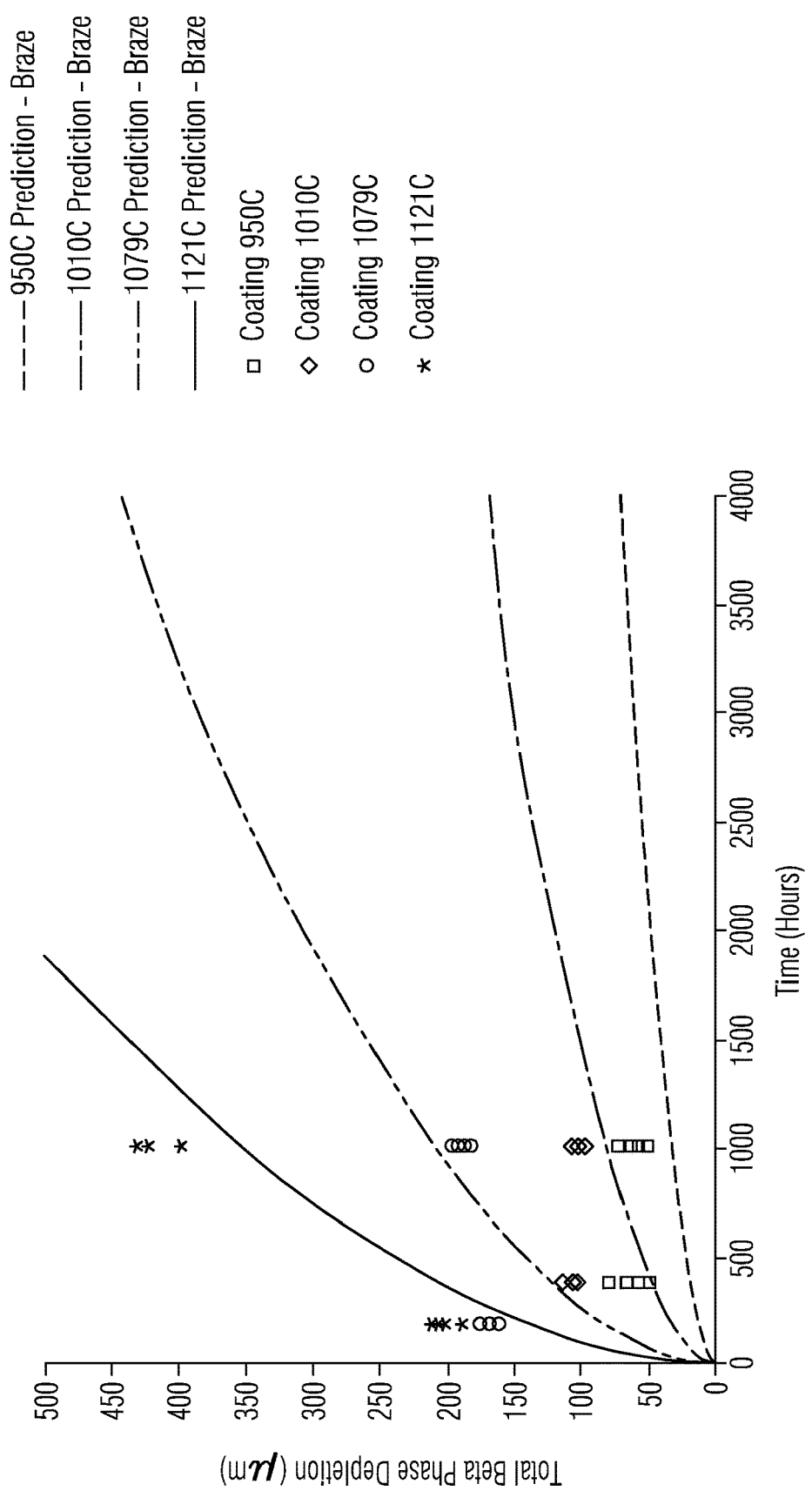
FIG. 8 is a graph illustrating the oxidation resistance of a bond coat applied by a PSP as described herein vs. a conventional thermally sprayed bond coat.

A PSP 114 comprising a bond coat powder and a braze powder as described herein was prepared along with an MCrAlY coating powder. The PSP was brazed to a first component surface and the MCrAlY powder was thermally sprayed on a second component surface. The deposited materials were then subjected to the following temperatures for a duration of 1000 hours: 950° C., 1010° C., 1079° C., and 1121° C. These temperatures cover the range of typical operating conditions for gas turbine ring segment parts. The results are illustrated in FIG. 8 and show that material loss or depletion was lower for the PSP having a composition as described herein vs. the thermally sprayed MCrAlY powder.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A repair process (100) comprising:
   removing (106) a damaged portion (108) of a service run turbine component (102) to reveal a repair surface (110);
   applying (112) a pre-sintered preform (114) to the repair surface (108) of the turbine component (102); and
   heating (120) the pre-sintered preform (114) and the turbine component (102) together to form a brazement (116) comprising a replacement protective coating (118) on the repair surface (110) upon cooling of the pre-sintered preform (114) and the turbine component (102);
   wherein the pre-sintered pre-form (114) is formed from a mixture of a bond coat powder and a braze powder;
   wherein the bond coat powder comprises by wt %:
   Ni: 33.0-35.0;
   Cr: 21.4-23.4;
   Si: 8.6-9.2;
   Al: 2.4-3.0;
   W 1.2-1.6;
   Ta 0.6-0.8;
   B 0.45-0.65;
   C 0.05-0.15;
   Fe 0.15-0.45; and
   Co balance
   and wherein the braze powder comprises by wt %:
   N 32;
   C 21;
   Al 8;
   Y 0.5; and
   Co balance.

2. The process (100) of claim 1, wherein the bond coat powder comprises from 0.01 to 0.3 by weight a member selected from the group consisting of Ti and Zr.

3. The process (100) of claim 1, wherein the bond coat powder comprises a composition by wt %:
   Ni 34;
   Cr 22.4;
   Si 8.9;
   Al 2.7;
   W 1.4
   Ta 0.7
   B 0.55
   C 0.12
   Fe 0.3; and
   Co balance.

4. The process (100) of claim 1, wherein the bond coat powder and the braze powder are provided in a 1:1 ratio by weight.

5. The process (100) of claim 1, wherein the heating is done at a temperature of at least 1100° C.+/−25° C.

6. The process (100) of claim 1, further comprising applying a thermal barrier coating on the protective coating (118).

* * * * *